March 1, 1949. R. H. VARIAN 2,462,925
RADIANT ENERGY DIRECTIONAL APPARATUS
Filed Dec. 7, 1946 2 Sheets-Sheet 1
Fig. 1.
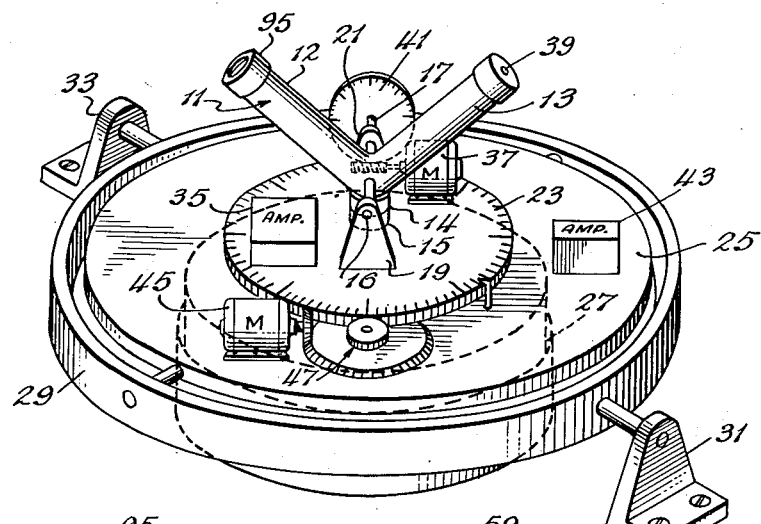
Fig. 2.
Fig. 3.
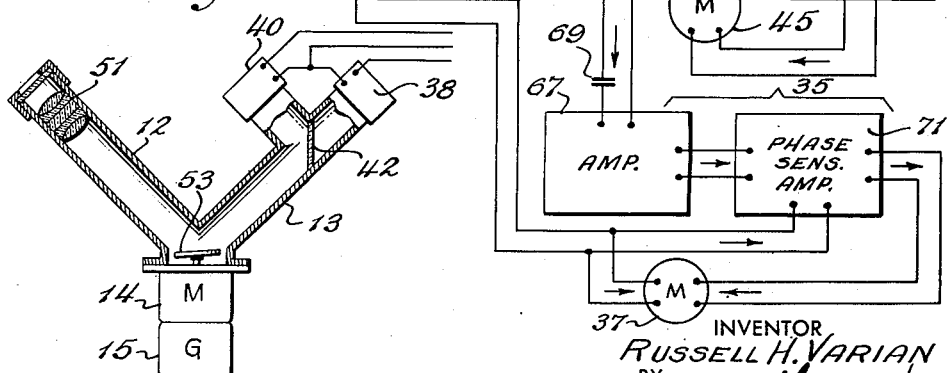
INVENTOR
RUSSELL H. VARIAN
BY Herbert P. Thompson
ATTORNEY.

March 1, 1949.   R. H. VARIAN   2,462,925
RADIANT ENERGY DIRECTIONAL APPARATUS
Filed Dec. 7, 1946   2 Sheets-Sheet 2

INVENTOR
RUSSELL H. VARIAN
BY
ATTORNEY

Patented Mar. 1, 1949

2,462,925

UNITED STATES PATENT OFFICE 2,462,925

RADIANT ENERGY DIRECTIONAL APPARATUS

Russell H. Varian, Palo Alto, Calif., assignor to The Sperry Corporation, a corporation of Delaware Application December 7, 1946, Serial No. 714,825

15 Claims. (Cl. 250—41.5)

The present invention relates to radiant energy direction-responsive apparatus. It is concerned primarily with an improved sextant system, and with apparatus features thereof adapted for maintaining predetermined relative alignment among a group of radiant energy transmission elements.

Sextants are instruments employed by navigators for determination of geographical position of aircraft and ships. A simple sextant includes a telescope mounted on an adjustable platform and arranged to be aimed toward a distant light source. A split-image mirror arrangement usually is provided for enabling the navigator to achieve simultaneous horizontal alignment of an eyepiece portion of the sextant (by sighting the horizon therethrough) and alignment of the telescope objective toward the distant light source. A protractor calibration is provided so that the navigator can conveniently measure the angle between the eyepiece axis and the telescope axis, this being the angle of elevation of the light source; and if desired, a protractor calibration may be provided for azimuthal direction as well. By reference to navigator's tables, taking into account the time of an observation, the navigator may determine the craft position.

The usefulness of the ordinary sextant is limited during daylight hours because stars which otherwise would provide convenient positional references are obscured from view by the intense scattered light arriving from the sky. These stars are not discernible through the sextant telescope, and hence they are of no aid to navigation during the day. Accordingly, the use of the ordinary sextant is limited by day principally to observations of the sun.

It is an object of the present invention to provide improved radiant energy responsive apparatus.

It is a further object to provide radiant energy apparatus capable of performing as a sextant and capable of following the direction of a selected star at night and during daylight hours as well, irrespective of visual discernibility of the star during the day through any ordinary optical apparatus.

Another object is to provide improved radiant energy apparatus for maintaining a predetermined relative alignment among a group of radiant energy transmission elements.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the present invention, there is provided a sextant usable throughout the daylight hours for star direction determination. This sextant is not dependent upon visual reference to the star; instead, it is provided with a directive telescope system and radiant energy responsive arrangement of such character that the telescope is automatically kept aimed toward the star. For this purpose, a focused image of the star is provided in the vicinity of a very narrow sensitive zone in a radiant energy responsive transducer, and periodical relative movement is effected between the image and the narrow response zone to effect correlated alternations of the amount of radiant energy impinging upon the zone.

As a result, alternations are produced in the output energy supplied by the transducer, the phase relations of these alternations and the regular relative movements being dependent upon average displacement between the image and the response zone, and hence dependent upon the direction of divergence between the axis of the sextant telescope and the line along which radiant energy arrives from the distant source. Servo mechanism is provided for regulating the direction of the telescope in response to the alternations in the output of the transducer, in such a way as to retain alignment between the objective and the radiant energy source.

The foregoing objects and features of the present invention will be more fully understood and other objects will be apparent from the following description of selected embodiments of the present invention, considered in relation to the accompanying drawings, wherein:

Fig. 1 is a general perspective view of a servo controlled sextant system constructed in accordance with the present invention, electrical interconnection details being omitted for the sake of clarity;

Fig. 2 is a schematic diagram, partly in section, showing internal optical features and the electrical connections of the apparatus generally illustrated in Fig. 1;

Fig. 3 is a view, partly in section, of a modification of the structure illustrated in Figs. 1 and 2;

Similar reference characters are employed throughout the figures to designate corresponding parts thereof.

Figure 4:
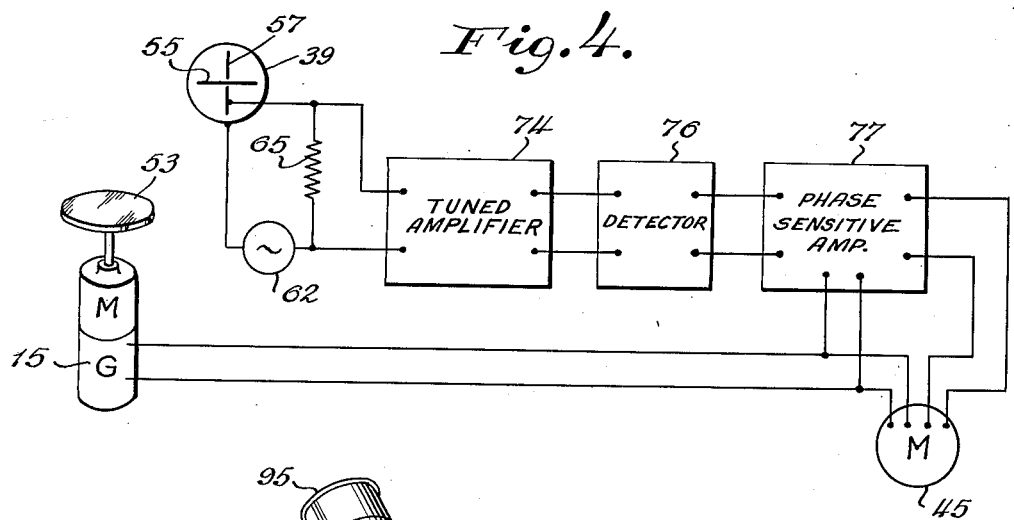
Fig. 4 is an illustration of a circuit modification applicable to the schematic diagram of Fig. 2.

In Fig. 1 there is shown a radiant energy responsive arrangement 11 including rigidly joined and angularly disposed tubular arms 12 and 13, a motor 14 and a generator 15. This arrangement 11 is supported in horizontal-axis pivots 16 and 17 in stanchions 19 and 21 provided on a circular plate 23. The circular plate 23 is journaled in a base plate 25 for rotation about a vertical axis. The base plate 25 may be any normally horizontal fixed platform, or a portion of a stable craft, or it may be stabilized as by a gyro vertical 27, attached or coupled thereto, in which event the base plate 25 is supported for freedom about perpendicular horizontal axes in a Cardan suspension system including a gimbal ring 29 journaled to plate 25 about a first horizontal axis and journaled about a second horizontal axis to stanchions 31 and 33 fixed to the craft upon which the sextant is employed.

A first servo system including an amplifier 35 and a motor 37 supplied thereby is arranged for responding to a radiant energy sensitive element or transducer 39 in the arrangement 11 and for controlling the orientation of the arrangement 11 about the horizontal axis i. e., for regulating this arrangement in elevation. For this purpose, the motor 37 may be coupled through speed reduction gear drive elements to a vertical disc 41 connected to the arrangement 11, and the disc 41 may be calibrated for indication of the angle of elevation of aiming of the arrangement 11.

A second servo system including an amplifier 43 which may also be responsive to transducer 39 and a motor 45 driven by the power output of amplifier 43 may be provided for adjusting the arrangement 11 in azimuth. For this purpose, the motor 45 may be coupled through a gear train 47 to gear teeth around the periphery of the horizontal circular plate 23. This plate may be calibrated for convenience in determining the azimuth angle of aiming of arrangement 11.

The internal elements of the arrangement 11 are illustrated in cross-section in Fig. 2. An objective lens system 51 is provided at or near the upper end of arm 12 for gathering radiant energy arriving from a distant source toward which arm 12 is aligned, and focusing this energy in a compact image of the source. A mirror 53 supported on the shaft of motor 14 is arranged to deflect the energy arriving through lens 51 in such a way that this energy is sent upward into arm 13 to the radiant energy sensitive element or transducer 39 provided at the upper end thereof.

The radiant energy sensitive element 39 preferably includes a first filamentary or elongated photoelectric cathode 55 and a second filamentary or elongated photoelectric cathode 57, crossed at substantially right angles. The inner surface 59 of the rear plate of transducer 39 serves as an anode 59, cooperating with photoelectric cathodes 55 and 57. A potential source 61 is connected at one terminal to the common anode 59, and the opposite terminal of the source is coupled through resistors 63 and 65 to the perpendicular filamentary cathodes 55 and 57, respectively. Cathode 55 is coupled to the input circuit of an amplifier 67 through a capacitor 69, and the output circuit of the amplifier 67 is coupled to the input circuit of a phase sensitive amplifier 71 having phase reference input terminals connected to an output circuit of generator 15. Elements 67, 69 and 71 together comprise the elevation servo amplifier 35. The output circuit of the phase sensitive amplifier 71 is connected to one phase winding of the elevation servomotor 37, and the other input winding of this servomotor is connected to the phase reference input circuit of amplifier 71.

Similarly, cathode 57 is coupled through a capacitor 73 to the input circuit of an amplifier 75; and the output circuit of the amplifier 75 is connected to the input circuit of a phase sensitive amplifier 77 having phase reference input terminals coupled to an output circuit of the generator 15. Elements 73, 75 and 77 comprise the azimuth servo amplifier 43, the output terminals of the phase sensitive amplifier 77 being connected to one input circuit of the two-phase azimuth servomotor 45 having its other input circuit connected to the phase reference terminals of phase sensitive amplifier 77. If preferred, motors 37 and 45 may be reversible direct-current motors operated from the output energy supplied by phase sensitive amplifiers 71 and 77, respectively, since such phase-sensitive amplifiers normally provide a reversible-polarity direct-current output component as well as amplified alternating-current output components. Where motors 37 and 45 are polyphase reversible motors, the phase reference voltage connections between the generator 15 and amplifiers 71, 77 may be omitted in view of the inherent phase-sensitivity of polyphase motors each having a fixed phase winding supplied directly by the generator 15.

The terminals of motor 14 are connected to an energization circuit including a power source 76 connected in series with a switch 78. The shaft of motor 14 is connected to the shaft of generator 15. The shaft of motor 14 bisects the angle of intersection of the axes of arms 12 and 13, the former axis being coincident with the axis of objective lens 51, and the latter axis intersecting both filamentary cathodes 55 and 57 of the radiant energy transducer 39. The reflective surface of the mirror 53 passes through the point of intersection of these axes.

The lens system 51 is arranged for a focal length corresponding to the total distance along the axes of arms 12 and 13 between the lens system 51 and the crossover region of filamentary cathodes 55 and 57. If the mirror 53 were perpendicular to the shaft of motor 14, then the focused image of a remote light source such as a star would be centered upon cathode 55 at the point of closest adjacency to cathode 57 when the axis of arm 12 and lens system 51 was aimed precisely toward the remote source of radiant energy. However, the mirror 53 is tilted slightly from an orientation perpendicular to the shaft of motor 14.

The tilted connection of the mirror is exaggerated in Fig. 2 in order to make this effect more apparent. As a consequence of the very slight tilt of mirror 53, the image of a distant radiant energy source such as a star is displaced slightly from a position on the axis of arm 13 in the vicinity of cathodes 55 and 57. Moreover, when the switch 78 is closed and motor 14 is operating, the rapid revolution of the tilted mirror 53 produces regular movement of the focused image of the remote energy source through a substantially circular orbit, and this orbit is concentric with a point on the axis of arm 13 between cathodes 55 and 57 when arm 12 is aimed exactly toward the remote source, e. g., toward a selected star.

The regular movement of the focused image through the circular orbit in the vicinity of the middle portions of filamentary cathodes 55 and 57 produces corresponding modulations of the outputs of these cathodes, and hence, corresponding alternating voltages at the input circuits of amplifiers 67 and 75. When the axis of arm 12 is aimed directly toward the remote energy source, the voltages supplied to amplifiers 67 and 75 contain no fundamental or odd-harmonic components relative to the frequency of rotation of motor 14. Upon a divergence in elevation of the axis of arm 12 from alignment toward the remote source, fundamental and odd-harmonic components of voltage are produced at the input circuit of amplifier 67 by the corresponding variations of radiant energy impinging upon cathode 55. Similarly, an azimuthal divergence of the axis of arm 12 produces fundamental and odd-harmonic alternating voltage components at the input circuit of amplifier 75.

The generator 15 preferably is a two-phase generator having one output phase winding connected to the phase reference input terminals of phase sensitive amplifier 71 and the other phase output winding connected to the phase reference input terminals of amplifier 77. This generator may be so arranged and coupled to motor 14 as to generate quadrature-phase output voltages of the fundamental frequency of rotation of mirror 53; or, if preferred, the generator 15 may be arranged to produce output voltages of an odd-harmonic of the frequency of rotation of mirror 53, e. g., of the third harmonic of this frequency. In case of fundamental frequency operation of generator 15, the servomotors 37 and 45 are actuated only by the fundamental component of alternating current output of amplifiers 71 and 77. In case of operation of generator 15 in such a way as to produce quadrature-phase output components at a selected odd-harmonic of the mirror rotation frequency, the servomotors 37 and 45 are actuated only by the corresponding odd-harmonic component of output of the respective amplifiers. Thus, neither of these motors is activated when the axis of arm 12 is precisely aligned with the radiant energy source.

Operation at an odd-harmonic affords the advantage that a greater signal-to-noise ratio is provided. The star image modulation component at the third harmonic is of the same order of effectiveness as the fundamental component while the interference component at this higher frequency is materially lower. Hence, this mode of operation is recommended.

Upon divergence from alignment of arm 12 with the source, the appropriate one of servomotors 37 and 45 (or both, in the event of error in both elevation and azimuth) will be energized in the direction to restore alignment of arm 12 directly toward the selected remote energy source, the direction of operation of each servomotor being determined according to the relative phase of the output of the associated servo amplifier.

Thus, once the navigator has set the arm 12 of arrangement 11 (Fig. 1) in an orientation of approximate alignment toward a selected star during the daylight hours, the elevation and azimuth servo systems thereupon operate to bring arm 12 into exact alignment with the star, and to maintain such alignment thereafter. The navigator is accordingly free to take the elevation reading from the calibration of disc 41, and, if desired, to make an azimuth reading from disc 23.

With the separate filamentary cathodes for elevation and azimuth control, and the associated separate servo systems, the operator is enabled first to achieve alignment as to one of these components and then as to the other, the elevation response being effective even with appreciable azimuthal divergence, and the azimuthal response being effective even with appreciable elevation divergence. Hence, the operator may align first for elevation, for example, and thereafter concentrate on azimuthal setting of the instrument.

An important advantage in the use of the filamentary cathodes or narrow, elongated sensitive areas of the transducer is the exposure of a relatively small total sensitive area to the arriving radiant energy—e. g., to scattered light from the sky—and the resultant low output current and low noise level in the transducer output circuit. Relatively low thermionic emission at ordinary temperatures is an accompanying advantage.

In Fig. 3 there is shown a modification of the structure of Fig. 2, to provide for separate elevation and azimuth radiant energy sensitive elements 38 and 40. Element 38 may include a horizontal filamentary cathode similar to cathode 55 of Fig. 2, while element 40 may include a filamentary cathode aligned substantially parallel with the axis of arm 13. Each of the radiant energy sensitive elements or transducers 38 and 40 includes an anode for cooperation with the filamentary cathode, and the anodes are connected together for connection to a terminal of the energization source, similarly as the common anode 59 of Fig. 2 is connected to a terminal of energization source 61.

In the modification illustrated in Fig. 3, a 45° semi-silvered mirror 42 is positioned in arm 13 passing through the point of intersection of the axis of arm 13 and the axis of transducer 40. This mirror permits approximately one-half of the energy coming through element 51 and deflected along arm 13 by mirror 53 to pass directly onward to transducer 38, and reflects the remaining energy perpendicularly to transducer 40. The arrangement shown in Fig. 3 offers the advantage of avoidance of a shadow cathode such as will be observed on cathode 57 of Fig. 2 due to the intervening perpendicular cathode 55 thereof. Thus, the choice of the dimensions of the radiant energy-sensitive cathodes and the diameter of the circular orbit of the image are rendered independent of considerations of interference due to an intervening cathode.

The system illustrated in Figs. 1-3 requires very high gain in the servo amplifiers 35 and 43. Consequently, the performance of the elevation and azimuth servo systems may at times be limited somewhat by noise generated in the amplifiers; and furthermore, the amplifiers must be very carefully designed and constructed to avoid feedback between a high-level point and a point of very low signal level. These difficulties may be abated somewhat by energization of the combination transducer 39 or the separate transducers 38 and 40 with high-frequency alternating voltage, and by employment of high-frequency tuned amplifiers and detectors for providing output voltages corresponding to the radiant energy modulations resulting from the rotation of the tilted mirror 53.

An arrangement of this type applicable to the system of Fig. 2 is illustrated in Fig. 4. In this view, the azimuth control cathode 57 of transducer 39 is energized through resistor 65 by a high-frequency alternating voltage source 62. The high-frequency alternating voltage developed across resistor 65 is modulated according to the regular variations of the radiant energy impinging upon cathode 57 of transducer 40. The voltage across resistor 65 is applied to the input circuit of a tuned amplifier 74, and the output circuit of amplifier 74 is coupled to the input circuit of a detector 76. The output circuit of the detector 76 is coupled to the input circuit of phase sensitive amplifier 77, and the phase reference input circuit and the output circuit of phase sensitive amplifier 77 are connected to generator 15 and servomotor 45 just as in Fig. 2. A similar arrangement may be provided in the elevation servo amplifier circuits, for corresponding advantages in minimization of amplifier noise with selective amplification, and in maximum isolation against feedback.

Figure 5:
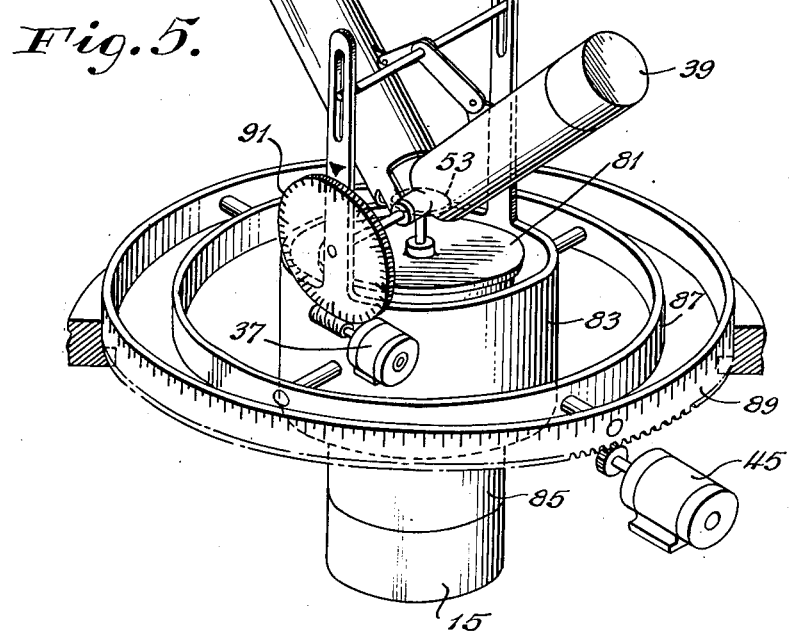
Fig. 5 illustrates a further mechanical organization of the optical elements and the servomotors of a system of the type represented in the diagram of Fig. 1.

In Fig. 5 there is illustrated a form of the invention in which the tilted mirror 53 is formed upon the top of a gyrovertical rotor 81. The rotor 81 is encased within a partially enclosing rotor housing 83 which includes a cantilever bearing motor section 85. The housing 83 is suspended through a Cardan suspension system including a gimbal ring 87 journalled on one horizontal axis to the housing 83 and along a substantially perpendicular, normally horizontal axis to an outer azimuth ring 89. The azimuth servomotor 45 is geared to ring 89 for controlling the azimuthal orientation of the entire assembly suspended from ring 89.

The objective lens arm 12 and the transducer arm 13 are connected to the gyrovertical rotor housing 83 through horizontal-axis pivotal supports, and are linked together for opposite rotations in such a way that the angle formed by their axes is always bisected by the gyrovertical rotor axis. Arm 12 is provided with an elevation gear dial 91 illustrated as worm-geared to the elevation servomotor 37, which, in this arrangement, is attached directly to the gyrovertical rotor housing 83. The masses of arms 12 and 13 are arranged to be balanced about the horizontal axis of elevation adjustment thereof, and the total mass centered on this axis is taken into account along with the mass of the remaining portions of the gyrovertical 81, 83, 85 in order to insure balance thereof about the point of intersection of the journal axes of the Cardan suspension system. Any of the well-known types of gyrovertical erectors may be employed in section 85 of the gyrovertical, for retaining the axis thereof in vertical alignment.

Servo amplifiers such as amplifiers 35 and 43 of Fig. 2 are provided in connection with the structure shown in Fig. 5, these amplifiers being omitted from Fig. 5 in the interest of simplicity.

The operation of the arrangement shown in Fig. 5 is generally like that of Fig. 2, but an important distinction resides in the fact that the orientation of the mirror 53 is not controlled by the operation of the elevation and azimuth servomotors. The axis about which mirror 53 is rotated remains vertical at all times, by virtue of the gyroscopic stability of the gyrovertical, and merely arms 12 and 13 and the lens system and transducer attached thereto are shifted in elevation relative to this established vertical axis. One advantage of this arrangement is the avoidance of any precessional effect accompanying operation of the servomotors, as may be observed in a structure of the type shown in Fig. 2 if the motor, generator, and mirror are relatively massive and are operated in conditions of very high speed revolution.

For phase reference purposes, the structure shown in Fig. 5 preferably includes a generator 15 of the type corresponding to the generator illustrated in Figs. 1, 2 and 3.

For improved discrimination in favor of starlight and in opposition to scattered energy received during the daylight hours, an infra-red filter 95 (Figs. 1, 2 and 5) may be provided at the end of arm 12 of the sextant, in order to exclude the very strong blue and other visible components of energy received from the sky during the daylight. Such a filter is a material aid in providing the unusual feature of maintained alignment with a star which is not visible during the daytime.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for determining the direction of arrival of weak rays of radiant energy arriving from a distant source among relatively strong rays of interfering radiant energy arriving from a wide field of directions, apparatus comprising a radiant energy transducer having a sensitive element of limited area, means for directionally transmitting to said transducer an image of said source obscured in radiant energy from said field, and means for producing regular relative movement between said sensitive element and said image to produce modulation of the output of said transducer.

2. Sextant apparatus comprising radiant energy sensitive means for varying an electric current in accordance with variation of the radiant energy received at a predetermined narrow zone thereof, directive and aimable means for receiving radiant energy from a distant source and focussing said energy in an image in the vicinity of said narrow zone, means for producing regular relative movement in a predetermined pattern between said image and said zone for producing regular variations in said electric current, and means responsive to the variation of said current for detecting divergence between the direction of said distant source and the direction of aiming of said receiving and focussing means.

3. Sextant apparatus as defined in claim 2, wherein said radiant energy sensitive means comprises a photocell having a light-sensitive cathode formed as a filament occupying said narrow zone.

4. Sextant apparatus as defined in claim 2, wherein said directive and aimable means for receiving and focussing energy comprises a lens system focussing said energy and a mirror for deflecting the energy received through said lens to the vicinity of said zone, and said means for producing regular relative movement between said image and said zone comprises means coupled to said mirror for regularly varying the direction of deflection of the energy.

5. Sextant apparatus as defined in claim 2, wherein said divergence detecting means comprises phase-sensitive means coupled to said radiant energy sensitive means and to said relative movement producing means for detecting the extent and the sense of said divergence according to the amplitude of the current variations through said radiant energy sensitive means and the phase of said variations relative to said regular movement.

6. Radiant energy apparatus comprising radiant energy sensitive means for varying an electric current in accordance with variation of the radiant energy impinging thereon, a mirror arranged to deflect radiant energy arriving from a source to the vicinity of said radiant energy sensitive means, motive means coupled to said mirror for producing regular changes of deflection of said arriving energy to cause corresponding regular changes of the energy impinging upon said zone, and means responsive to the variation of current controlled by said radiant energy sensitive means for controlling the relative positions of said mirror and said radiant energy sensitive means in accordance with said current variation.

7. Radiant energy apparatus comprising radiant energy sensitive electric means for varying an electric current in accordance with variation of the radiant energy impinging upon a selected zone thereof, a mirror to deflect radiant energy arriving from a source to the vicinity of said zone, motive means coupled to said mirror for rotating said mirror regularly about an axis slightly inclined relative to the perpendicular to said mirror to provide movement throughout a circular path of the radiant energy deflected through said mirror, and means responsive to the electric current controlled by said radiant energy sensitive means for varying the relative orientations of said mirror, said radiant energy sensitive means and said source in accordance with variations in said electric current.

8. Radiant energy apparatus as defined in claim 7, wherein said means for varying relative orientations comprises means jointly responsive to the rotation of said mirror and the current controlled by said radiant energy sensitive means for controlling the directional relation between said mirror and said radiant energy sensitive means according to the magnitude of said current and the phase thereof relative to the rotation of said mirror.

9. Radiant energy apparatus as defined in claim 7, wherein said means for varying relative orinetations comprises means jointly responsive to the rotation of said mirror and the current controlled by said radiant energy sensitive means for controlling the orientation of said mirror and the direction between said mirror and said radiant energy sensitive means according to the magnitude of said current and the phase thereof relative to the rotation of said mirror.

10. In a system for determining the direction of weak rays of radiant energy arriving from a distant source among relatively strong rays of interfering radiant energy arriving from a wide field of directions, apparatus comprising a radiant energy transducer having a sensitive element of limted area, means for directionally transmitting to said transducer an image of said source obscured in radiant energy from said field, a filter interposed between said source and said sensitive element, said filter being so arranged as to attenuate the radiant energy arriving from said field more than the radiant energy arriving from said source, and means for producing regular relative movement between said sensitive element and said image to produce modulation of the output of said transducer according to the direction of said distant source.

11. Radiant energy apparatus comprising a radiant energy transducer for varying an electric current in accordance with variation of the radiant energy impinging thereon, a gyrovertical having a reflective surface fixed to the rotor thereof to deflect radiant energy arriving from a source to said radiant energy sensitive means, said reflective surface being slightly divergent from perpendicular to the axis of said rotor so that the deflection of said energy varies cyclically with the rotation of the gyrovertical rotor, whereby regular modulation is effected in the output of said transducer, and means responsive to the variation of current controlled by said transducer for controlling the relative orientation of said reflective surface and said transducer in accordance with said current.

12. Radiant energy responsive apparatus comprising first and second narrow, elongated radiant energy sensitive units extending in transverse directions, means for transmitting to said units a compact image of a radiant energy source, means for effecting regular relative movement between said units and said image for modulating the radiant energy amounts received by said units, and first and second servo mechanisms respectively responsive to said first and second units for controlling the relative orientation of said transmitting means and units and said source according to the modulations of energy of said units.

13. Radiant energy responsive apparatus as defined in claim 12, wherein said first unit is horizontal, said first servo mechanism is arranged to control the direction of reception of energy in elevation, and said second servo mechanism is arranged to control the direction of reception of energy in azimuth.

14. Radiant energy apparatus comprising means for producing an image of a source of radiation in or near the visual spectrum, means for causing said image to trace and retrace a regular pattern at a predetermined frequency, radiation-sensitive means for receiving said image and for detecting relative displacement between said pattern and said radiation-sensitive means by changing the frequency components and phase of the output of said radiation-sensitive means with respect to the frequency at which said pattern is traced.

15. Radiant energy directional apparatus employing relative positional modulation of the image of an energy source to effect a second modulation of energy affecting an energy-responsive receiving element, said second modulation being variable in phase and frequency components with respect to said positional modulation.

RUSSELL H. VARIAN.

(References on following page)

REFERENCES CITED

The following references are of record in the file of this patent:

UNITED STATES PATENTS

| Number | Name | Date |
|---|---|---|
| 1,976,648 | Wittkuhns | Oct. 9, 1934 |
| 1,999,646 | Wittkuhns | Apr. 30, 1935 |
| 2,102,587 | Eliel | Dec. 21, 1937 |
| 2,155,402 | Clark | Apr. 25, 1939 |
| 2,246,884 | Johnson | June 24, 1941 |
| 2,369,622 | Toulon | Feb. 13, 1945 |

FOREIGN PATENTS

| Number | Country | Date |
|---|---|---|
| 352,035 | Great Britain | June 22, 1931 |

OTHER REFERENCES

Article by A. E. Whitford and G. E. Kron "Photoelectric Guiding of Astronomical Telescopes," published March 1937, in R. S. I., p. 78–82, copy in Div. 54.